Figure 1:
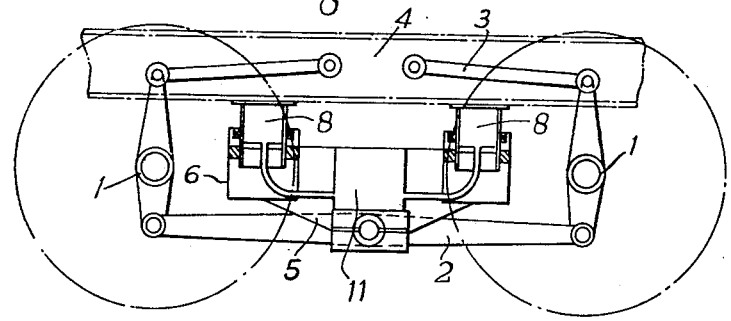

Aug. 14, 1962    H. D. CHAMBERS    3,049,362
HYDRAULIC SUSPENSION FOR VEHICLE TANDEM AXLES
Filed Feb. 24, 1959    4 Sheets-Sheet 1

INVENTOR:
Harry D. CHAMBERS
BY:
Wenderoth, Lind & Ponack
ATTORNEYS

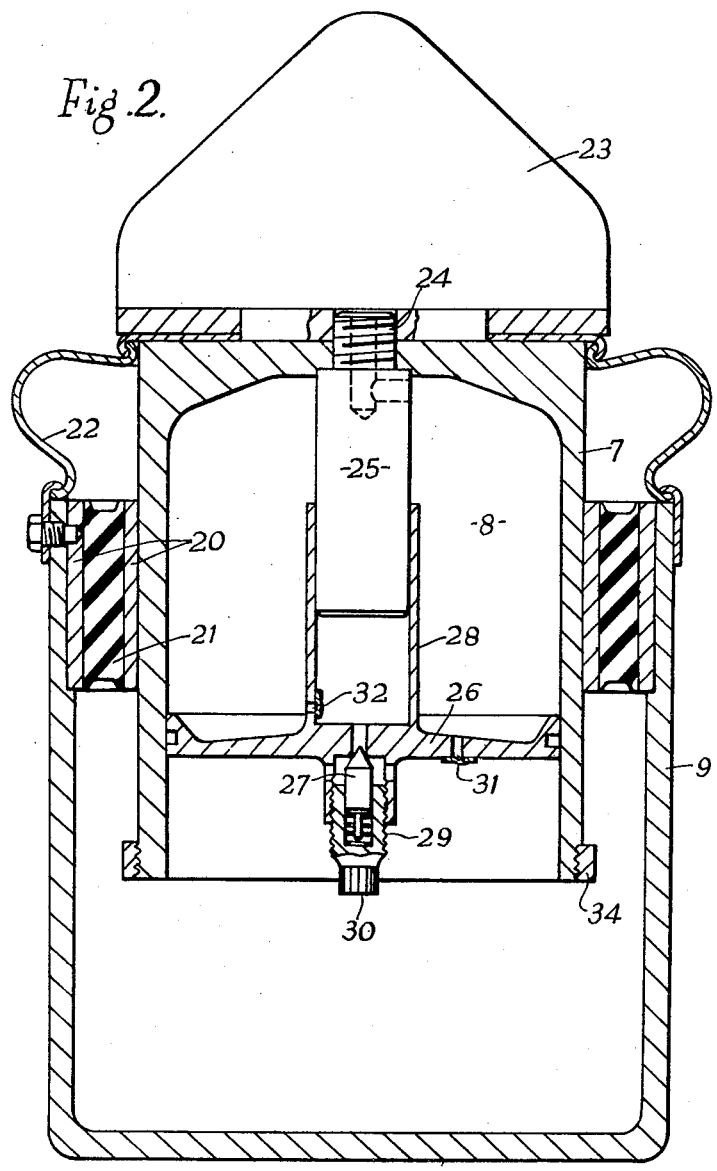

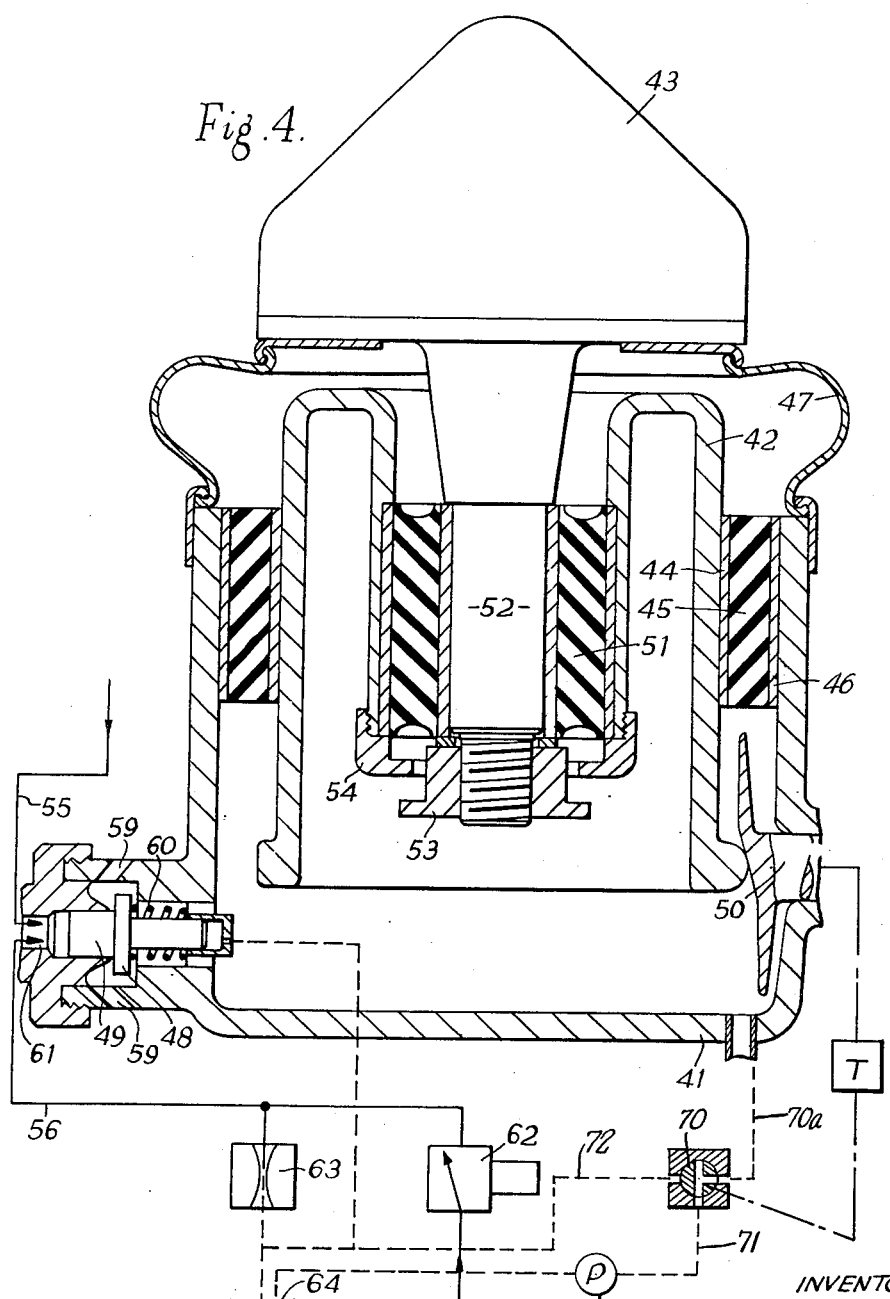

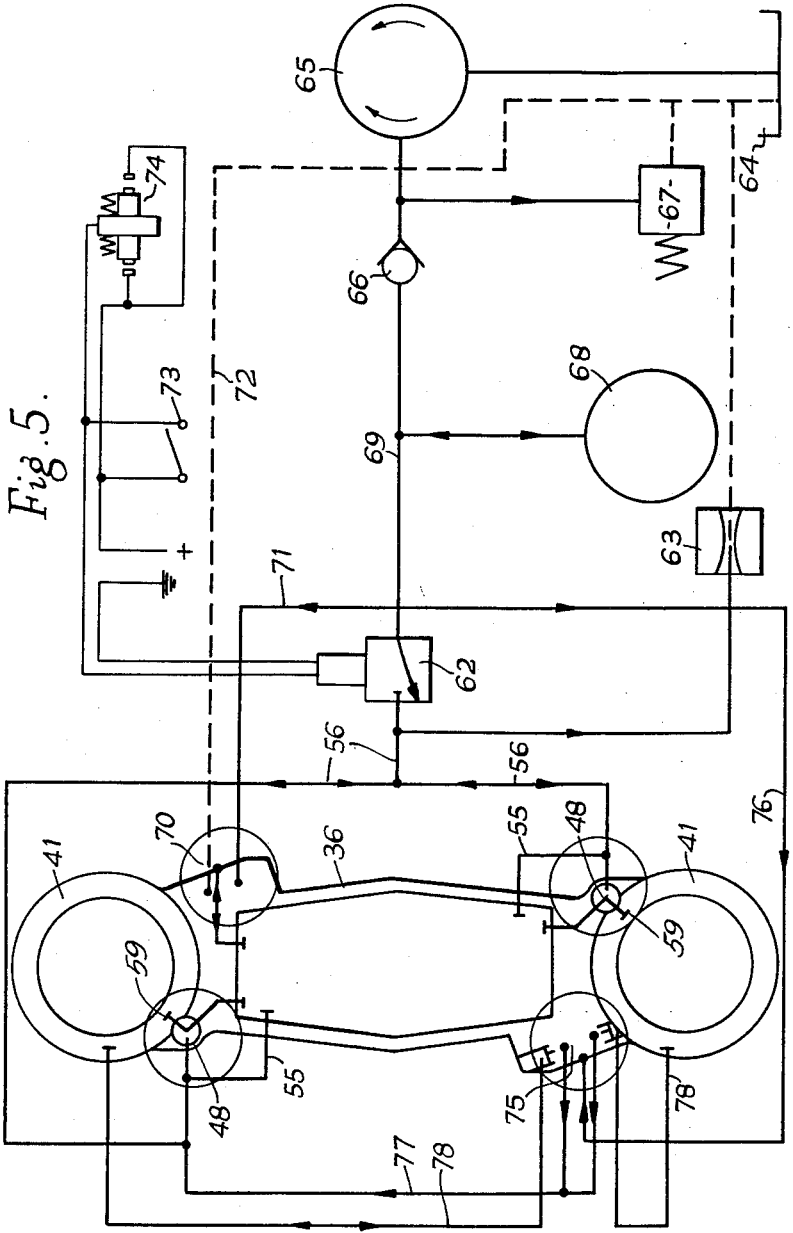

United States Patent Office 3,049,362
Patented Aug. 14, 1962

3,049,362
HYDRAULIC SUSPENSION FOR VEHICLE TANDEM AXLES
Harry D. Chambers, Cuddington, near Northwich, England, assignor to Eaton Axles Limited, Warrington, Lancashire, England, a British company
Filed Feb. 24, 1959, Ser. No. 795,258
Claims priority, application Great Britain Feb. 28, 1958
6 Claims. (Cl. 280—124)

The present invention relates to suspensions for tandem axle systems for vehicles wherein air (or other gas) is used to provide a resilient suspension. In particular the invention relates to the provision of a driving connection between a tandem axle system and a vehicle body or frame, the tandem axle system being movable as a whole relative to the vehicle body or frame in the vertical direction and the weight of the vehicle being transmitted to the tandem axle system through a volume of air held in an enclosed space.

The present invention provides a tandem axle suspension unit, adapted to be interposed between a vehicle frame and tandem axles, comprising, at both sides of the vehicle, at least one downwardly facing ram member secured to the vehicle frame and a co-operating cylinder member rigidly secured to an axle support co-axially with the ram member and surrounding at least the lower end of the ram member, the ram member being axially movable in relation to the cylinder member and in sealed relation therewith to prevent escape of hydraulic fluid contained in the cylinder member and constructed to permit the transfer of lateral forces between the ram member and the cylinder member whilst the axial loading on the ram member is applied to one or more enclosed masses of gas, the axles being connected to opposite ends of a pivoting beam connected to the axle support member.

Preferably two or more parallel rams and co-operating cylinder members are longitudinally spaced between the vehicle frame and the axle support member.

Some angular movement is preferably permitted between the axle support and the vehicle frame by providing a degree of freedom between the ram member and the cylinder member. These two members are preferably spaced by a sleeve consisting of or including a resilient deformable sleeve of rubber or rubber-like material.

The cylinder members contain hydraulic fluid into which the bottom ends of the ram members dip and the loading on the ram members is transferred to the enclosed gas through the medium of the hydraulic fluid. The gas may be enclosed in a separate hydraulic accumulator unit in which the gas is held in a flexible envelope to separate from the hydraulic fluid, the body of the accumulator being connected to the fluid space in the cylinder members.

As an alternative arrangement the gas may be enclosed in hollow spaces in the rams themselves, so that it is trapped immediately above the hydraulic fluid.

The load supporting characteristics of the system may be varied by variation of the mass of gas or the effective mass of hydraulic fluid. Of these courses the latter is preferred, because efficient and reliable hydraulic pumps having a high working pressure can be obtained at reasonable price. The system is preferably made self-compensating by providing valving which is arranged to maintain a substantially constant riding height of the vehicle, irrespective of loading.

In addition to its use for transmitting the load from the vehicle frame to the axles, the system of the present invention also performs a shock-absorbing function, for which purpose a restriction may be imposed on the flow of hydraulic fluid. This is preferably arranged in the passage from the ram and cylinder unit to hydraulic accumulator unit. This restriction may be in the form of a valve of small aperture, the valve being closable either voluntarily of the vehicle and/or automatically in response to a roll-sensitive device. It may be desirable to lock out the suspension voluntarily to avoid damage, as for example in the case of a tipper vehicle during loading and unloading. The automatic locking out of the suspension may be desirable in order to prevent severe rolling on S-bends, which is a known disadvantage of pneumatic suspensions.

Figure 3:
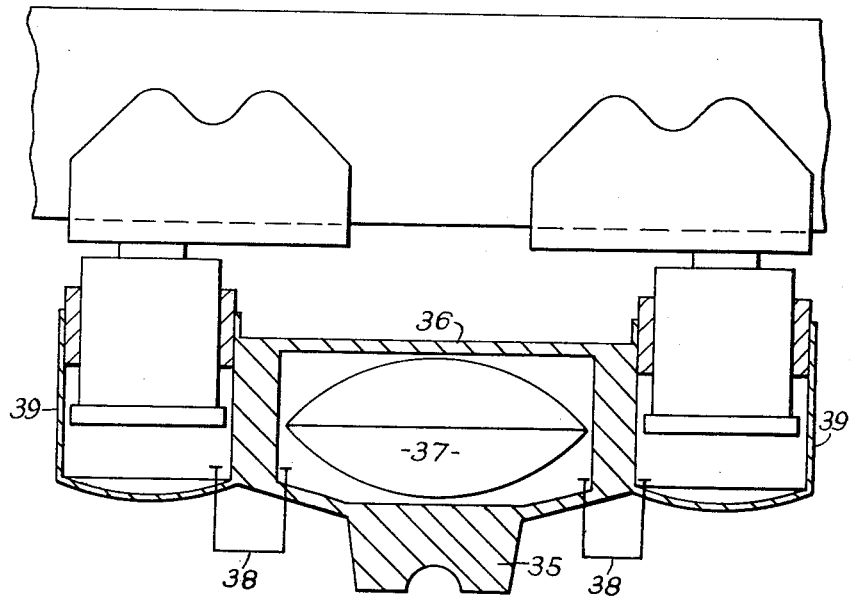

The invention is hereinafter described with reference to the accompanying drawings wherein:

FIGURE 1 is a diagrammatic side view of one form of tandem axle suspension unit made in accordance with the invention, FIGURE 2 is a section of a form of oleo-pneumatic support unit for use in the suspension unit of FIGURE 1, FIGURE 3 is a diagrammatic side view of an alternative form of tandem axle suspension unit, FIGURE 4 is a section of a hydraulic ram and cylinder unit, FIGURE 5 is a diagram of the complete hydraulic system of the unit of FIGURE 3.

In the construction shown in FIGURE 1 the axles 1 are pivotally secured to the ends of rigid beams 2 and located by means of torque rods 3 which are pivotally secured to the frame members 4 of the vehicle.

The beam 2 at each side of the vehicle is pivotally attached to a saddle 5, which forms the axle support of the construction.

Stresses are transmitted between the axles 1 and the frame members 4 by means of support units 6.

The support unit shown in FIGURE 2 has a hollow ram member 7 which is secured to the frame member 4 and has an interior air space 8. The internal and external surfaces of the ram member are machined to a high surface finish so as to permit the formation of an effective sliding seal therewith.

The lower end of the ram member 7 dips into hydraulic fluid held in a container or cylinder member 9 secured to the saddle 5 and the air in the air space 8 is thus trapped. The container is sealed off by a seal which consists of a pair of metal sleeves 20 bonded to a rubber intermediate layer 21. The outer sleeve 20 is secured to the container 9 against endwise movement, whereas the ram member 7 slides in the inner sleeve 20. Any hydraulic liquid which passes the seal is held within the space inside the flexible gaiter 22, from where it is ducted back to the liquid reservoir through a drain line (not shown).

The intermediate layer 21 serves to damp the transmission of horizontal shock loads between the cylinder member 9 and the ram member 7 and permits transverse articulation in relation to the vehicle frame.

The air in the space 8 is separated from the hydraulic liquid in the container 9 by a separator disc 26 which is freely slidable within the internal bore of the ram member 7 and is guided on the pin 25. The purpose of the disc 26 is to prevent admixture of the air and hydraulic liquid and thus to reduce or obviate forming.

In operation, increase or decrease of vertical loading on the ram member 7 will lead to compression or expansion of the gas in the air space 8 (hydraulic liquid being treated as incompressible for practical purposes). The air in the space 8 thus acts as a spring to absorb vertical shock loads on the axles 1 in a manner analogous to a conventional metal spring.

The springing characteristics of the support unit can be varied to suit the load on the vehicle by varying the pressure of the air in the air space under static conditions. This can be achieved in two ways, i.e. addition or subtraction of hydraulic fluid in the cylinder 9 or increase or release of air from the air space 8. For this purpose air may be led from an air supply reservoir through a connection 24 in the bracket 23, through a passage in the guide pin 25 to the air space 8. The air supply reservoir 11 is shown diagrammatically connected to the air space 8 in FIGURE 1. Alternatively or additionally a hydraulic pressure line may connect the cylinder 9 with a hydraulic liquid reservoir.

It is found, in practice, that the height of the ram 7 relative to the container 9 should be maintained fairly constant irrespective of the load to secure good riding conditions. Thus, in the construction shown liquid is pumped into the container 9 (preferably in response to automatic control mechanisms) until the desired riding height is achieved. The admission valve then closes and liquid is thereafter only pumped into the container to maintain the correct riding height by making good the loss of hydraulic liquid past the seal.

Oil passing the seal is trapped in a low pressure liquid space by an auxiliary seal in the form of a flexible gaiter 22, from which liquid is piped back to the reservoir.

A spring-loaded valve member 27 is provided in the disc 26 so that the space between the pin 25 and a tubular portion 28 of the disc 26 may be employed to provide compression stroke damping, ejecting fluid through the valve 27.

In order to provide a degree of stabilisation against roll, arrangements may be made to lock the valve 27 so as to hold the space inside the portion 28 full of oil to provide a substantially incompressible strut with the pin 25. The spring action of the unit is thus "locked out." Various mechanisms such as a pendulum-type valve may be used to achieve this result. As illustrated in FIGURE 2, the valve 27 may be locked out by rotating the threaded sleeve 29 by engagement of a rotating means (not shown) with a pinion 30.

Recuperator valves 31 and 32 may be provided to maintain a small constant head of hydraulic liquid above the disc 26 for lubrication purposes. Maintaining a small head of oil is however only one function of the valve 31. When "locked out" or operating on the compression stroke, fluid is forced through into the air space 8. This is desirable for lubrication of the dashpot system but must, of course, be limited. The valve 31 is arranged to blow off as soon as gas pressure in the air space 8 exceeds oil pressure in the container 9, which will occur when the leak oil from the tubular portion 28 compresses the air. The fluid pressure in the portion 28 is, of course, very much higher than the gas pressure, under "locked out" conditions.

Recuperator valve 32 replenishes the dashpot on the suction stroke, the valves 31 and 32 being adjusted in relation to each other for this purpose. The valve 31 must close with sufficient oil trapped in the space 8 to allow the portion 28 to be replenished without sucking air and still leave a nominal head of fluid for lubrication of the disc 26.

Although not so shown in FIGURE 2, the ram member 7 may be of sufficient length to contact the bottom of the container 9 and thus act as a bump stop in the event of shock overload and the ring 34 on the ram 7 may contact the bottom of the inner ring 20 to act as a rebound stop.

In the construction shown in FIGURE 3, the axles, the support beam for the axles and the torque rods are not shown and are the same as in FIGURE 1. In this construction a modified form of saddle 35 supports a hydraulic accumulator having an enclosed casing 36, filled with hydraulic fluid and containing a sealed gas-containing envelope 37, formed of two rectangular sheets of rubber-like material, welded to each other at the edges, so that the enclosed volume can vary through a wide range without much extension of the skin. This is necessary because under static conditions the contained volume may increase ten times between fully laden and unladen conditions.

The casing 36 of the hydraulic accumulator is connected through damping valves, shown diagrammatically at 38, with hydraulic ram and cylinder units 39. These units are shown in FIGURE 4.

The hydraulic ram and cylinder unit shown in FIGURE 4 comprises a container or cylinder member 41, which is secured to the axle support or saddle 35, and a ram member 42 connected to the vehicle frame through a bracket 43 secured to the frame.

The ram member 42 slides in a metal sleeve 44 which may be bonded to a rubber annulus 45 bonded also to a sleeve 46 secured to the container member 41, or a solid guide bush may be used. The sliding fit of the ram 42 in the sleeve 44 forms the primary seal for the hydraulic fluid space in the cylinder member 41 and any hydraulic fluid that leaks through is collected in the low pressure space bounded by the rolling diaphragm 47 (which may be replaced by a bellows type diaphragm), from which space it is piped back to an oil reservoir by means which are not shown.

The flow of liquid between the liquid space in the cylinder 41 and the hydraulic accumulator is through the damping valve 48, comprising a poppet valve member carried by a hydraulically operated piston 49.

The interior of the valve body is connected with the accumulator casing 36 through a port 59. The valve 48 is held off its seating by a valve spring 60 at a distance which is determined by the pressure applied to the piston 49 through the inlet 61.

The inlet 61 may be connected with one or both of lines 55 and 56 connected respectively to the accumulator casing 36 or to the vehicle oil pressure supply source, which is a necessary adjunct of the system for controlling the static riding height of the vehicle.

The valve spring 60 is arranged so as to become coil bound and incompressible at a predetermined distance from its seat, so that there is always a minimum flow path between the valve 48 and its seat.

Considering first the effect of the connection with the line 55, this produces a varying pressure on the piston 49, according to the pressure difference across the valve 48, giving a "feedback" effect, so as to relate the amount of damping to the sprung mass of the vehicle. In this operation the minimum value aperture always maintained by the spring 60 ensures that there is a minimum flow path for fluid on the rebound stroke of the system.

The connection with the line 56 on the other hand is for the purpose of suspension lockout, under which the valve 48 is held at minimum aperture with the spring 60 fully compressed. The connection with the pressure supply source is normally shut off by a solenoid-operated lock out valve 62. The full supply pressure of the hydraulic system can be admitted by energising the solenoid and in this condition the suspension is locked against rapid movement. The line 56 is provided with a bleed valve 63 leadnig back to a reservoir 64 to release pressure on the piston 49 when the lock out valve 60 is closed.

The oil pressure source, usually a gear pump 65 (FIG. 5) driven by the vehicle engine is used to control the static height of the vehicle frame with variation of load.

Oil is injected into or released from the system automatically in response to changes of the vertical position of the ram member 42, which acts on a cam-faced plunger 50, provided with a return spring (not shown). Vertical movement of the ram member 42 will be reflected in a longitudinal movement of the plunger 50 and this, in turn, is utilised to operate a three position, three connection valve 70 which releases hydraulic liquid to a reservoir as the ram rises and by means of pump 65 injects fluid into the liquid space as the ram descends through a connection 70a. As shown in FIG. 4, the plunger 50 is being permitted to move to the left by the ram members 42, as it moves downwardly, and the connection between the plunger 50 and the valve 70 has caused the valve 70 to turn to the position in which high pressure hydraulic liquid is admitted to the liquid space through the line 70a between the valve and the container 41. Leakage of oil past the sleeve 44 is thus automatically made good and the vehicle frame is kept at an even riding height. In order to avoid response of the three position valve to ordinary road shocks, some form of time delay T is interposed between the plunger 50 and the valve.

The travel of the bracket 43 in relation to the container 41 is greater than that of the ram 42, so as to keep the swept volume of the apparatus relatively small. This is achieved by connecting the bracket 43 to the ram member 42 by means of a resilient rubber bushing 51 connected to the ram member and to a boss 52 secured to the bracket.

The system is preferably arranged so that during normal riding (partly or fully laden) there is a clearance between the top of the ram 42 and the bottom of the bracket, but on the rebound stroke the boss 52 can move upwards against the resistance offered by the rubber bushing 51 until a projecting flange 53 contacts an inturned flange 54 on the ram member.

Referring now to FIGURE 5, high pressure hydraulic leads are shown in full lines and low pressure leads in broken lines. Hydraulic fluid for the system is drawn from the reservoir 64 by an engine driven pump 65, from which it passes through a check valve 66. The spring-loaded relief valve 67 being provided for the safety of the system. A hydraulic accumulator 68 is optionally provided to permit the use of a smaller hydraulic pump, whilst maintaining the charging time, necessary to raise the vehicle frame to its static riding height, at a low value.

The effective quantity of oil in the air suspension is controlled by a three position valve 70, which, according to its position, is effective to admit fluid into the casing 36 through the high pressure lead 71, to hold the casing isolated or to release fluid through the low pressure lead 72. The valve is controlled by the plunger 50 shown in FIGURE 4. It will be appreciated that it is only necessary to provide such a plunger in one hydraulic support unit at each side of the vehicle.

The solenoid valve 26 in its electrical circuit is provided with parallel switches; a manual switch 73 and a "g" switch 74. The manual switch 73 permits the supply pressure of the pump 65 to be applied to the pistons 49 of the valves 48 for volunary lock out purposes, as for example when waiting to receive a load. The "g" switch 74 automatically closes to open the valve 62 for the same purposes when the vehicle rolls by more than a predetermined amount.

A conventional automatic lock out valve 75 is provided to minimise longitudinal tipping of the saddle 35, which could ensue from heavy braking or acceleration. The commencement of such tipping must result in a momentary difference in pressure within the two cylinder members 41. This difference is employed to actuate the valve 75, which in turn immediately admits hydraulic oil from the line 69 to the pistons 49 of the valves 48 to close the valves and thus check the tipping movement.

The valve 75 is similar in construction to that shown in FIGURE 5 of patent application No. 772,065, now abandoned, except that the time delay means is omitted.

The valve 75 has a spool, which in a central rest position, seals off an inlet port connected to a lead 76, in turn connected to the lead 69. Displacement of the spool from its central position permits hydraulic fluid to flow from the lead 76 to one of two outlet ports, both of which are connected to a lead 77, in turn connected with the leads 56. Longitudinal displacement of the spool in either direction will thus cause hydraulic oil under high pressure to be admitted to the pistons of the valves 48. The valves will thus be locked out and they will remain in this condition until the pressures in the cylinders 41 substantially equalise by reason of the slow passage of fluid through the valves 48, which can take place in the locked condition.

The longitudinal movement of the valve spool is effected by providing pistons on its two ends, which are exposed through leads 78 to the hydraulic fluid pressure in the two cylinders 41 and in consequence the valve spool only moves out of its central position when there is a pressure difference.

I claim:

1. In a hydropneumatic suspension system for vehicles, in combination, hydraulic accumulator means, a support unit adapted to be interposed between the sprung mass and the unsprung mass of a vehicle and comprising a cylinder member for hydraulic fluid, a ram member movable in said cylinder member in sealed relation therewith, said ram member incorporating a central boss, a surrounding annular ram portion and a resiliently deformable member of rubbery material connecting said annular ram portion to said central boss for transmitting axial forces therebetween, said resiliently deformable member permitting limited longitudinal movement between said annular ram portion and said boss, fluid connection means between said cylinder member and said hydraulic accumulator means for passage of hydraulic fluid therebetween, a high pressure source of hydraulic fluid, means for supplying hydraulic fluid under high pressure to said support unit from said high pressure source and for releasing hydraulic fluid from said support unit, and means responsive to the position of said ram member in said cylinder member connected to said supplying and releasing means for regulating the quantity of hydraulic fluid in said support unit and said hydraulic accumulator means.

2. A support unit for incorporation in a hydropneumatic suspension system for vehicles comprising, in combination, a cylinder member for hydraulic fluid, a ram member movable in said cylinder member in sealed relation therewith, said ram member incorporating a central boss, a surrounding annular ram portion and a resiliently deformable member formed of rubbery material connecting said annular ram portion and said central boss and permitting limited longitudinal movement between said annular ram portion and said central boss, fluid passage means in the wall of said cylinder member, damping valve means located in said fluid passage means, and means responsive to the position of said ram member and said cylinder member for regulating the quantity of hydraulic fluid in said support unit.

3. The support unit as claimed in claim 2, wherein the damping valve means comprises a valve member, opposed abutments between which said valve member is movable, said valve member having a piston portion, and a cylinder having a connection for the admission of hydraulic fluid thereto and in which cylinder said piston portion is slidable.

4. In a tandem axle suspension unit for a vehicle frame, in combination a pair of axles, a pair of rigid beam members connecting said axles, an axle support member to which each of said members is pivotally connected intermediate its ends, a pair of upwardly facing, parallel cylinder members secured to each support member, a cooperating ram member for attachment to the frame of a vehicle being in sealed relation with each of said cylinder members for axial movement therein, said ram members and cylinder members being adapted to transfer horizontal forces between said axle supports and the vehicle frame, each ram member comprising a central boss adapted to be secured rigidly to a vehicle frame, a surrounding annular ram portion and a resiliently deformable member of rubbery material connecting said central boss to said ram portion and permitting limited longitudinal movement between said annular ram portion and said central boss, the enclosed space between each such ram member and cylinder member being filled with hydraulic fluid, hydraulic accumulator means, and means connecting each space with said hydraulic accumulator means, a mass of gas being enclosed in said hydraulic accumulator means in substantial pressure balance with the hydraulic fluid, said hydraulic accumulator means being external of said cylinder members.

5. The combination claimed in claim 4 further comprising a hydraulic pressure pump for drawing hydraulic fluid from a reservoir and supplying same to said cylinder members, a levelling valve mounted in one of said cylinder members and having a member projecting into said one cylinder member to coact with the ram in said one cylinder member so that the position of said member is controlled by the position of said ram in said one cylinder member to adjust the quantity of hydraulic fluid in said one cylinder member.

6. In a support unit adapted to be interposed between the sprung mass and the unsprung mass of a vehicle in a hydropneumatic suspension system, in combination, a cylinder member, a ram member in said cylinder, said ram member incorporating a central boss, a surrounding annular ram portion normally coaxial with said central boss and movable in said cylinder in sealed relation with the cylinder wall, and a resiliently deformable annular member of rubbery material around and normally coaxial with said central boss and within said annular ram portion and connecting said central boss with said annular ram portion, said central boss extending through said annular member, the ends of said annular member being substantially unconfined for permitting limited longitudinal and tilting movement of said annular ram portion in relation to said central boss.

References Cited in the file of this patent
UNITED STATES PATENTS

| | | |
|---|---|---|
| 722,146 | Robertson | Mar. 3, 1903 |
| 1,055,164 | Green | Mar. 4, 1913 |
| 2,107,494 | Onions | Feb. 8, 1938 |
| 2,422,327 | Winslow | June 17, 1947 |
| 2,436,908 | Van Weenen et al. | Mar. 2, 1948 |
| 2,493,004 | Mackie | Jan. 3, 1950 |
| 2,707,110 | Stover | Apr. 26, 1955 |
| 2,841,354 | Humble | July 1, 1958 |
| 2,905,459 | Fikse | Sept. 22, 1959 |
| 2,915,307 | Heiss | Dec. 1, 1959 |
| 2,916,284 | Bertsch | Dec. 8, 1959 |